United States Patent
Zanato et al.

(10) Patent No.: US 11,099,111 B2
(45) Date of Patent: Aug. 24, 2021

(54) TEST COUPON AND TEST METHOD

(71) Applicants: ZF Friedrichshafen AG, Friedrichshafen (DE); ZF PADOVA S.R.L., Caselle di Selvazzano (IT)

(72) Inventors: Marco Zanato, Selvazzano Dentro (IT); Paolo Marangon, Cadoneghe (IT); Alessandro Fincato, Selvazzano Dentro (IT)

(73) Assignees: ZF FRIEDRICHSHAFEN AG, Friedrichshafen (DE); ZF PADOVA SRL., Caselle di Selvazzano (IT)

( * ) Notice: Subject to any disclaimer, the term of this patent is extended or adjusted under 35 U.S.C. 154(b) by 203 days.

(21) Appl. No.: 16/344,475

(22) PCT Filed: Oct. 4, 2017

(86) PCT No.: PCT/EP2017/075097
§ 371 (c)(1),
(2) Date: Apr. 24, 2019

(87) PCT Pub. No.: WO2018/082851
PCT Pub. Date: May 11, 2018

(65) Prior Publication Data
US 2019/0257727 A1  Aug. 22, 2019

(30) Foreign Application Priority Data

Nov. 4, 2016  (DE) ...................... 10 2016 221 651.1

(51) Int. Cl.
*G01N 3/54* (2006.01)
*G01M 13/021* (2019.01)
*G01N 3/42* (2006.01)

(52) U.S. Cl.
CPC ............ *G01N 3/54* (2013.01); *G01M 13/021* (2013.01); *G01N 3/42* (2013.01);
(Continued)

(58) Field of Classification Search
CPC ........ G01M 13/021; G01N 2203/0266; G01N 2203/027; G01N 2203/0298;
(Continued)

(56) References Cited

U.S. PATENT DOCUMENTS 2,712,754 A    7/1955  Holm
4,534,225 A *  8/1985  Peacock .................... G01N 3/02
                                                    248/632
(Continued)

FOREIGN PATENT DOCUMENTS

CN    105 277 455 A    1/2016
DE         14 801      6/1958
(Continued)

OTHER PUBLICATIONS

German Search Report Corresponding to 10 2016 221 651.1 dated Jul. 13, 2017.
(Continued)

*Primary Examiner* — Jonathan M Dunlap
(74) *Attorney, Agent, or Firm* — Fitch & Maloney, PLLC; Michael J. Bujold

(57) ABSTRACT

A test coupon (1) for an ISO-standard-conforming test method for testing a material hardness of gearwheels. The test coupon (1) is designed as a two-piece test coupon (1) including a casing body (2) and a test body (3). The test coupon (1) being tested by an ISO-standard-conforming test method for determining a material hardness of the gearwheels.

7 Claims, 2 Drawing Sheets

(52) U.S. Cl.
CPC .......... *G01N 2203/027* (2013.01); *G01N 2203/0266* (2013.01); *G01N 2203/0298* (2013.01); *G01N 2203/0405* (2013.01)

(58) Field of Classification Search
CPC ..... G01N 2203/0405; G01N 2203/076; G01N 2203/0429; G01N 2203/0452; G01N 2203/0647; G01N 3/42; G01N 3/54; G01N 3/02; G01N 3/08; G01N 3/40; G01N 1/36; G01N 33/383; G01N 33/44
See application file for complete search history.

(56) References Cited

U.S. PATENT DOCUMENTS

| | | | |
|---|---|---|---|
| 6,996,264 B2* | 2/2006 | Hauck | G01N 3/08 382/141 |
| 8,015,861 B2* | 9/2011 | Braun | G01N 3/40 73/81 |
| 2003/0188591 A1* | 10/2003 | Workman | G01N 1/28 73/866 |
| 2004/0096093 A1* | 5/2004 | Hauck | G01N 3/42 382/141 |
| 2010/0186488 A1* | 7/2010 | Braun | G01N 3/40 73/81 |
| 2012/0325028 A1 | 12/2012 | Tanaka et al. | |
| 2016/0273882 A1 | 9/2016 | Coats | |
| 2018/0171435 A1* | 6/2018 | Tenne | C22C 23/00 |

FOREIGN PATENT DOCUMENTS

| | | |
|---|---|---|
| JP | S61-260143 A | 11/1986 |
| KR | 2012 0085947 A | 8/2012 |

OTHER PUBLICATIONS

International Search Corresponding to PCT/EP2017/075097 dated Dec. 7, 2017.

Written Opinion Corresponding to PCT/EP2017/075097 dated Dec. 7, 2017.

International Preliminary Report on Patentability Corresponding to PCT/EP2017/075097 dated Feb. 12, 2019.

Luis Sanhueza et al., "Photochromic Solid Materials Based on Poly(decylviologen) Complexed with Alginate and Poly(sodium 4-styrenesulfonate)", Journal of Physical Chemistry Part B: Condensed Matter, Materials, Surfaces, Interfaces & Biophysical, Bd. 119, Nr. 41, Oct. 6, 2015 (Oct. 6, 2015), pp. 13208-13217.

"Calculation of load capacity of spur and helical gears—Part 5: Strength and quality of materials", ISO 6336-5:2016, ISO, Aug. 1, 2016 (Aug. 1, 2016), pp. 1-47.

* cited by examiner

TEST COUPON AND TEST METHOD

This application is a National Stage completion of PCT/EP2017/075097 filed Oct. 4, 2017, which claims priority from German patent application serial no. 10 2016 221 651.1 filed Nov. 4, 2016.

FIELD OF THE INVENTION

The invention relates to a test coupon for a test method that conforms with ISO standards, for testing the material hardness of gearwheels and to a test method that conforms with ISO standards, for testing the material hardness of gearwheels by means of a test coupon.

BACKGROUND OF THE INVENTION

The International Organization for Standardization—ISO for short—is an international association of standardization organizations and develops international standards in all possible fields except for electrical and electronic engineering and telecommunications. Designated ISO Standard 6336-5, a standardized method for determining the hardness of gearwheels is known. This method includes among other things the use of a so-termed test coupon, which is made from the same material as the gearwheels to be tested and has undergone the same processing steps. In this context the processing steps include on the one hand the manner of production, such as a forging process or a casting process, and on the other hand subsequent processing steps such as heat treatment of the gearwheels. Then the properties of the test coupon can be investigated in order to draw conclusions about the properties of the gearwheels, in particular their hardness. As a rule these investigations result in the destruction of the test coupons since they have to be cut or broken up in order to be able to test the hardness under the surface, inside the material. Thus, cutting up or destruction of the gearwheels themselves is advantageously not necessary. The test coupons described in ISO Standard 6336-5 have strictly prescribed dimensions, depending on the specific application concerned.

However, a disadvantage of the method and test coupons described and standardized by ISO Standard 6336-5 is that the test coupons can only be used once. Furthermore, since their dimensions are strictly prescribed they cannot arbitrarily be made smaller or lighter, and especially when high production outputs of gearwheels are involved, high costs can be incurred just for producing the test coupons.

SUMMARY OF THE INVENTION

The purpose of the present invention is to propose an improved test coupon for a test method conforming with ISO standards for testing a material hardness of gearwheels.

According to the invention, this objective is achieved by the test coupon for a test method conforming with ISO standards for testing a material hardness of gearwheels, according to the independent claim(s). Advantageous features and further developments of the invention emerge from the dependent claims.

The invention relates to a test coupon for a test method conforming with ISO standards for testing a material hardness of gearwheels. The test coupon according to the invention is characterized in that the test coupon is made in two pieces, consisting of a casing body and a test body.

This two-piece form has the advantage that to test the material properties of the test coupon, in particular a material hardness inside the test coupon, it is not necessary to cut or break up, and thus destroy, the entire test coupon. Rather, the two-piece form of the test coupon according to the invention makes it possible to investigate the material properties of—and consequently to destroy exclusively the test body itself, while in contrast the casing body can be preserved and used again. Thus the costs of carrying out, the test method conforming to ISO standards for testing the hardness of gearwheels can be substantially reduced compared with the current ISO-standard-conforming method since, compared with the test coupon specified for the current ISO-standard-conforming test, the test body is preferably smaller and therefore requires less material and is less costly.

In the context of the invention the term "ISO-standard-conforming test method" is understood to mean a test method which, under the same conditions as the corresponding current ISO standard method, produces the same results as the corresponding current ISO standard method, but for this does not use the test coupon defined in the corresponding current ISO standard but, rather, makes use of the test coupon according to the invention.

Since the test coupon according to the invention enables an ISO-standard-conforming test method to be carried out, the further advantage is obtained that the material hardness determined by means of the test coupon according to the invention is identical to a material hardness which has been determined using the test coupon defined in the current ISO standard. Thus, as regards their test results the test coupon according to the invention and the test coupon defined in the current ISO standard are interchangeable.

According to a preferred embodiment of the invention it is provided that the casing body is cylindrical with a concentric and disk-shaped recess at one end of the cylinder for receiving the test body.

Since the test body can be held in a recess of the casing body, the size of the casing body is necessarily larger than the test body. Since the test body is intended to be used only once whereas in contrast the casing body is intended for multiple use, this has the advantage that only the comparatively smaller and less costly of the two bodies has in each case to be replaced.

In the context of the invention, a cylindrical form of the casing body is understood to mean that a height of the casing body is larger than a diameter of the casing body. Thus, the casing body can to a large extent correspond with the spatial form of the test coupon defined in the current ISO standard.

The test body is preferably disk-shaped. In the context of the invention a disk shape is understood to mean that a height of the test body is smaller than a diameter of the test body. Likewise, a height or depth of the disk-shaped recess is smaller than a diameter of the recess.

Preferably, it is provided that the spatial form of the recess corresponds to the spatial form of the test body plus a certain tolerance, in order to enable the test body to be inserted into and extracted from the recess in a simple manner.

Thus, to carry out the test method the test body can be held in the recess of the casing body. The test body is surrounded on its underside and around the periphery of the disk by the casing body. Only an upper side of the test body is still free. During the testing process the casing body is preferably stood on the end of the cylinder which does not have the recess holding the test body.

In a further preferred embodiment of the invention, it is provided that the casing body has a lateral bore which connects an outside of a cylindrical casing surface of the casing body with the recess. This has been found advantageous for achieving test results as identical as possible with the test coupon according to the invention, as with the test coupon defined in the current ISO standard.

Preferably, it is provided that the diameter of the lateral bore is 3 mm. This has been found particularly well suited for the achievement of identical test results.

According to a further preferred embodiment of the invention, it is provided that the test coupon is designed for a test method conforming to ISO Standard 6336-5 for testing the material hardness of gearwheels. ISO Standard 6336-5 defined a widespread and recognized test method for testing the material hardness of gearwheels. Since the test coupon according to the present invention is designed for a test method conforming to ISO Standard 6336-5, the test results obtained by means of this widespread and recognized test method can be obtained comparatively inexpensively by using the test coupon according to the invention.

The specific structure of the test coupon for the test method conforming to ISO Standard 6336-5 is produced by adapting the spatial dimensions of the casing body and of the test body, in particular exclusively by adapting the spatial dimension of the casing body.

Preferably, it is provided that the test coupon is designed for a test method conforming to ISO Standard 6336-5:2064-07 for testing the material hardness of gearwheels.

According to a particularly preferred embodiment of the invention, it is provided that the test coupon (1) is designed as a test coupon conforming with Module 5, a test coupon conforming with Module 8 or a test coupon conforming with Module 10 as defined in ISO Standard 6336-5. According to ISO Standard 6336-5 these are quite common structural forms of the test coupon.

Preferably, it is provided that in all its structural forms the test coupon has in each case an identically designed test body and is adapted to the respective desired structural form exclusively by changing the dimensions or material of the casing body. Since in that way, for all structural forms of the test coupon an identically designed test body is always used, there is a large number of identical pieces, namely the test bodies, so that the costs for producing the test coupon according to the invention can be further reduced.

In a further preferred embodiment of the invention, it is provided that the casing body consists of steel, in particular steel according to AISI 310. With a casing body made of steel, in particular steel according to AISI 310, not only are the test results obtained particularly close to those obtained using the current ISO standard, but in addition the reusability of the casing body for further repetitions of the test method is particularly good. When the casing body is made from steel according to AISI 310, it has been shown in test series that the casing body can be re-used around 120 times before the test results obtained with the test coupon according to the invention begin to increasingly deviate from the test results that have been obtained by means of a test coupon produced in accordance with the current ISO standard.

According to a further preferred embodiment of the invention, it is provided that regarding its material and its production method the test body corresponds to the gearwheels to be tested. Since the material and production method of the test body correspond to the material and production method of the gearwheels to be tested, even after heat treatment or hardening the test body behaves very similarly to the gearwheels to be tested. This favors the greatest possible identity between the test results from the test coupon according to the invention and those from a test coupon made in accordance with the current ISO Standard.

In the context of the invention, the term "material of the test body" is understood to mean a specific material composition of the test body, such as a specific steel alloy with a defined carbon content.

In the context of the invention, the term "production of the test body" is understood to mean a specific method for producing the test body, such as whether it is a forged, rolled or cast test body.

The invention further relates to an ISO-standard-conforming test method for testing a material hardness of gearwheels by means of a test coupon. The method according to the invention is characterized in that the test coupon is a test coupon according to the invention. This gives the advantages already described in connection with the test coupon according to the invention.

According to a further preferred embodiment of the invention it is provided that the method comprises the following steps:

a test body undergoes an identical production method from a material identical to that of the gearwheels to be tested, the test body is inserted into a concentric and disk-shaped recess in one cylinder end of a casing body, the test coupon together with the gearwheels to be tested are heat treated, the test body is removed from the casing body, the material hardness of the test core is determined, and with reference to the material hardness of the test core, the material hardness of the gearwheels is determined.

In summary, carrying out the above steps produces test results, which are to the greatest possible extent identical to test results obtained by means of a test method according to the current ISO standard, on which the ISO-Standard-conforming test method according to the invention is based.

Preferably, it is provided that the method is one that conforms with ISO Standard 6336-5 for testing a material hardness of gearwheels by means of a test coupon.

According to a further preferred embodiment of the invention, it is provided that the material hardness of the test body is determined spatially centrally in the test body. Due to phase shifts of the temperature inside the test body compared to a temperature in the surroundings of the test body, heat treatment has different effects at the surface of the test body and on the inside of the test body. As has been shown, it is precisely the material hardness inside the test body, especially at the spatial center of the test body, which allows reliable conclusions to be drawn about the material hardness of the gearwheels. This is of interest since as a rule it is not only the pure surface hardness of the gearwheels, but rather also a material hardness of the gearwheels on their inside, since that internal material hardness is decisive for the load-bearing ability of the gearwheels.

Preferably, it is provided that the test body is cut or broken up through the middle so as to be able to determine the material hardness at its spatial center.

BRIEF DESCRIPTION OF THE DRAWINGS

Below, the invention is explained with reference to example embodiments illustrated in the figures, which show.

DETAILED DESCRIPTION OF THE PREFERRED EMBODIMENTS

In all the figures the same objects, functional units and comparable components are denoted by the same indexes. As regards their technical features these objects, functional units and comparable components are designed identically unless explicitly or implicitly indicated by the description.

Figure 1:
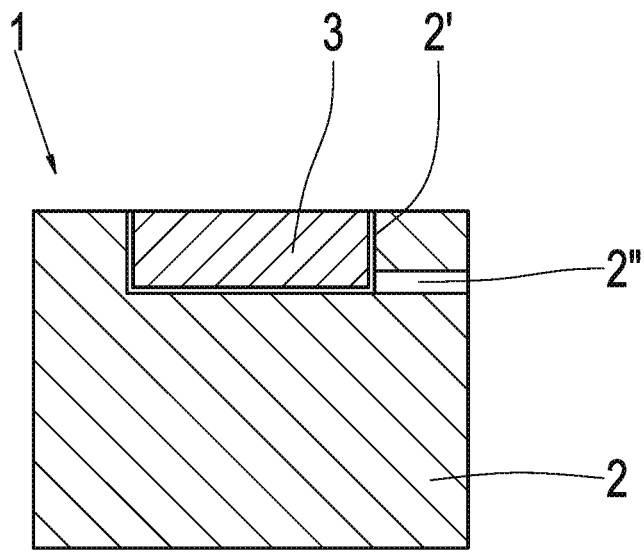
FIG. 1: As an example, a schematic cross-section through a two-piece test coupon according to the invention.

FIG. 1 shows as an example and in schematic form a cross-section through a two-piece test coupon 1 according to the invention for an ISO-standard-conforming test method for testing a material hardness of gearwheels, which test coupon consists of a casing body 2 and a test body 3. In this case the casing body 2 is cylindrical with a concentric and disk-shaped recess 2' at an upper end of the cylinder. The recess 2' serves to hold the also disk-shaped test body 3. The dimensions of the recess 2' correspond to the dimensions of the test body 3 plus a tolerance in order to ensure problem-free fitting of the test body 3 into the recess 2' and problem-free removal of the test body 3 from the recess 2'.

As can also be seen, the casing body 2 has a lateral bore 2" that connects an outside cylindrical surface of the casing body 2 to the recess 2'. The test coupon 1 with the dimensions shown in FIG. 1 corresponds to one designed in accordance with the ISO standard and defined as a Module 5 test coupon, and the casing body 2 is made from steel according to AISI 310. On the other hand, the test body 3 consists of the same material as the gearwheels to be tested and has undergone the same production process.

Figure 2:
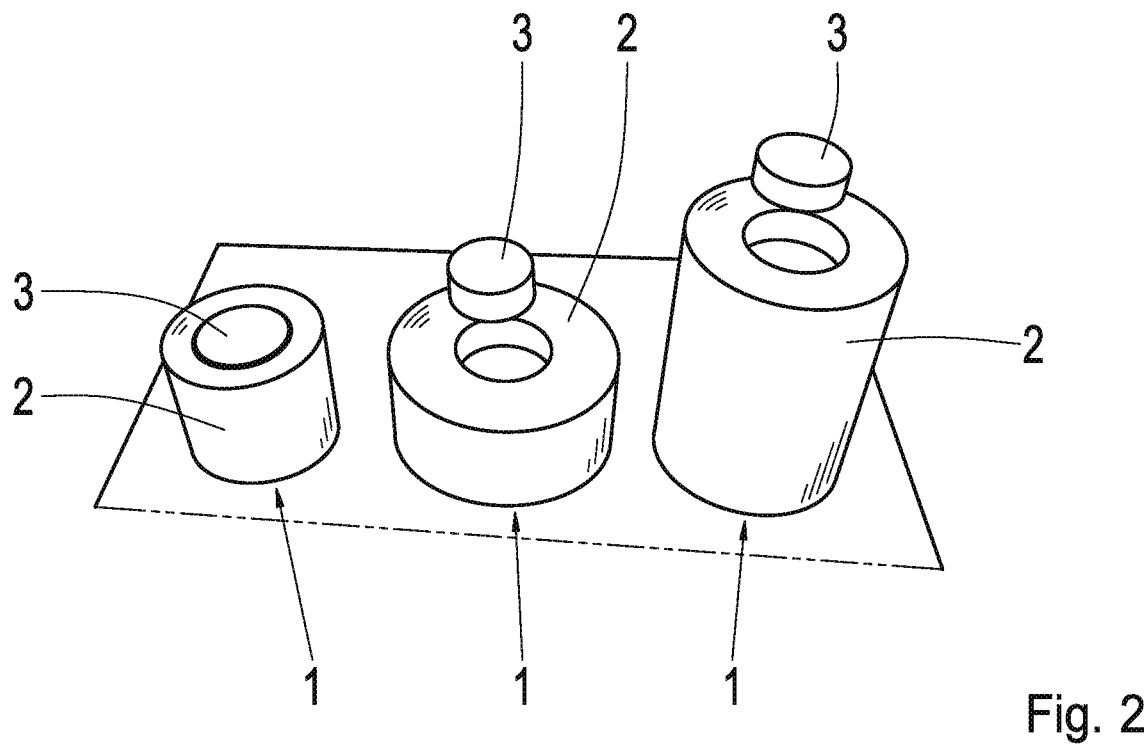
FIG. 2: As examples, three different embodiments of test coupons according to the invention.

FIG. 2 shows as examples three different embodiments of test coupons 1 according to the invention. Each of the test coupons 1 shown consists of a casing body 2 and a test body 3. As examples, the test coupons 1 shown in FIG. 2 are designed as a Module 5 one (on the left in FIG. 2), a Module 8 one (central in FIG. 2) and a Module 10 one (on the right in FIG. 2) in accordance with ISO Standard 6336-5.

Figure 3:
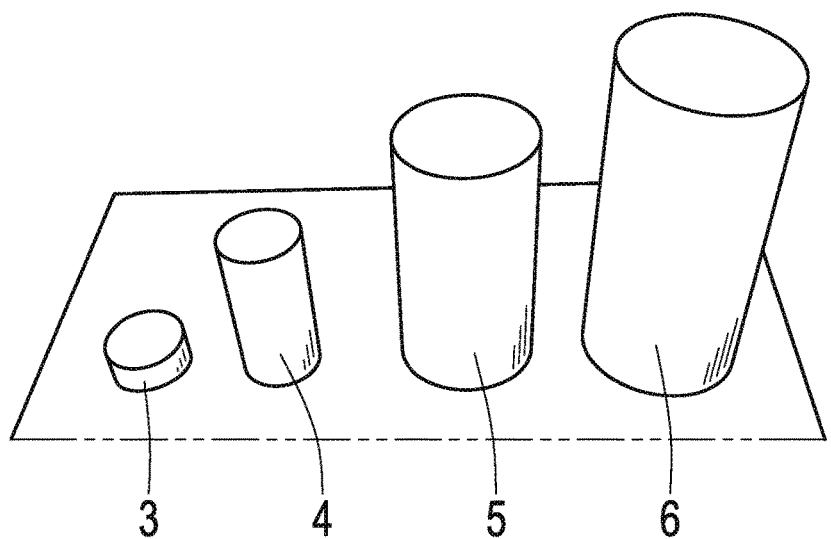
FIG. 3: As examples, a test body for a test coupon according to the invention and three one-piece test coupons.

FIG. 3 shows as examples a test body 3 for a test coupon 1 according to the invention and three one-piece test coupons 4, 5 and 6, which are designed in accordance with ISO Standard 6336-5. By virtue of their standardization the test coupons 4, 5 and 6 are generally known and are widely used in the prior art. In this case the test coupon 4 is designed as a so-termed Module 5 according to ISO Standard 6336-5, the test coupon 5 is a Module 8 and the test coupon 6 is a Module 10 test coupon. As can be seen, the test body 3 is by comparison much smaller than the test coupons 4, 5 and 6. Since both the test body 3 and the known test coupons 4, 5 and 6 can only be used for a single test process and will then be scrapped, by using the smaller and more favorable test body 3 in a test coupon according to the invention a lot of material and thus cost can be saved.

Figure 4:
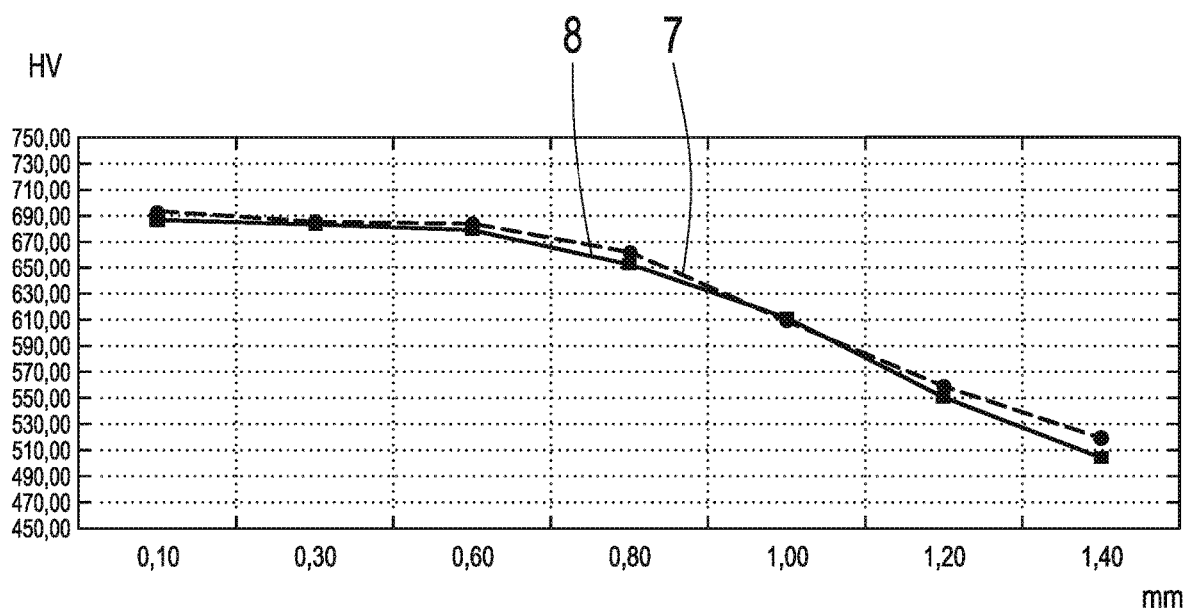
FIG. 4: As an example, comparison measurements made using a test coupon designed according to the invention and a test coupon designed in accordance with ISO Standard 6336-5.

FIG. 4 shows as an example a comparative measurement made with a test coupon 1 according to the invention and a test coupon 5 of the Module 8 design according to ISO Standard 6336-5. The test coupon 1 according to the invention on which the comparison measurement is based corresponds in this case to the test coupon 5 designed as a Module 8 test coupon. The comparison measurement shown comprises various measurement points of the material hardness made both using the test coupon 1 according to the invention and using the test coupon 5 designed in accordance with ISO Standard 6336-5, which points have been plotted on the same diagram and joined to produce measurement curves 7 and 8. The x-axis shows a depth of the measurement point concerned in the material, i.e. its distance away from the surface of the test coupon 1 or the test coupon 5, given in millimeters. The y-axis shows the material hardness measured, in HV units. The dashed measurement curve 7 shows the measurement data obtained using the test coupon 1 according to the invention, while the solid measurement curve 8 shows the measurement data obtained using the test coupon 5 made in accordance with ISO Standard 6336-5. As can be seen, the two measurement curves 7 and 8 are very close to one another, so that one can speak of an equivalence of the test method according to the invention and the test method according to the current ISO standard, or of an interchangeability of the test coupon 1 and the test coupon 5 designed in accordance with ISO Standard 6336-5.

Figure 5:
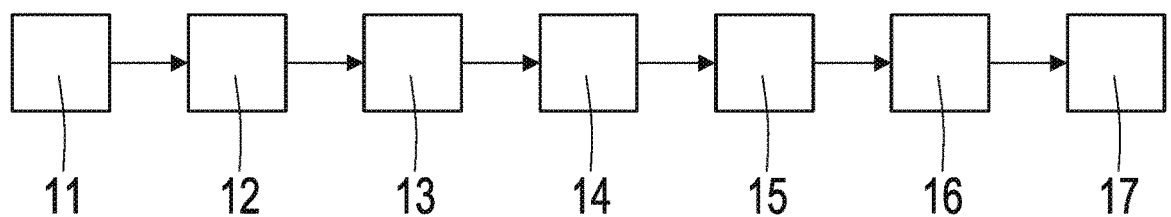
FIG. 5: An example of an embodiment of a test method according to the invention in the form of a flow diagram.

FIG. 5 shows as an example an embodiment of an ISO-standard-conforming test method according to the invention for testing a material hardness of gearwheels by means of a test coupon 1, in the form of a flow diagram. In a first process step 11 a test body 3 undergoes an identical production process, and is made from an identical material as the gearwheels to be tested. In step 12 the test body 3 is inserted into a concentric and disk-shaped recess 2' in a cylinder end of a casing body 2 of the test coupon 1. In the next step 13 the test coupon 1 is heat treated together with the gearwheels to be tested. After the heat treatment, in step 14 the test body is removed again from the casing body 2. In step 15 the test body 3 is now cut along its centerline so that a spatial middle of the test body 3 is made accessible for measurements of the material hardness. In the next process step 16 the material hardness of the test body 3 is determined. Finally, in step 17 the material hardness of the gearwheels is determined with reference to the material hardness of the test body 3.

INDEXES

1 Test coupon
2 Casing body
2' Recess
2" Lateral bore
3 Test body
4 Test coupon, Module 5
5 Test coupon, Module 8
6 Test coupon, Module 10
7 Measurement curve
8 Measurement curve
11 Production of the test body
12 Insertion of the test body
13 Heat treatment
14 Removal of the test body
15 Cutting of the test body
16 Determination of the material hardness of the test body
17 Determination of the material hardness of the gearwheels

The invention claimed is:

1. A test coupon for an ISO-standard-conforming test method for testing a material hardness of a gearwheel, the ISO-standard-conforming test method being a test method which under same conditions as a corresponding ISO Standard method, gives the same results as the corresponding ISO Standard method, but uses a two-piece test coupon and does not make use of a test coupon as defined in the corresponding ISO Standard method, the test coupon being a two-piece test coupon comprising a casing body and a test body, the casing body comprising steel, such that the material and production of the test body corresponds to the gearwheels to be tested, the test body and the casing body together with the gearwheels to be tested being heat treated, and the test coupon being designed such that an investigation of material properties and a consequent destruction being carried out exclusively on the test body while, in contrast, the casing body being preserved and being reusable.

2. The test coupon according to claim 1, wherein the casing body is cylindrical and has a concentric and disk-shaped recess, at one end of the cylinder, for holding the test body.

3. The test coupon according to claim 2, wherein the casing body has a lateral bore, which connects an outside of a cylinder outer surface of the casing body to the recess, and the cylinder outer surface being fully received within the recess.

4. The test coupon according to claim 1, wherein the casing body comprises steel according to AISI 310.

5. An ISO-standard-conforming test method for testing a material hardness of a gearwheel by a test coupon, wherein an ISO-standard-conforming test method is a test method which, under same conditions as a corresponding ISO Standard method, produces the same results as the corresponding ISO Standard method, but uses a two-piece test coupon and does not use a test coupon as defined in the corresponding ISO Standard, the two-piece test coupon comprising a casing body and a test body, the casing body comprising steel, such that the material and production of the two-piece test coupon corresponds to the gearwheel to be tested, the two-piece test coupon together with the gearwheel to be tested are heat treated, and the two-piece test coupon is designed such that an investigation of material properties and a consequent destruction are carried out exclusively on the test body while, in contrast, the casing body being preserved and being reusable, the method comprising:

producing the test body with an identical production process and from an identical material as the gearwheels to be tested, inserting the test body into a concentric and disk-shaped recess on a cylinder end of the casing body, heat treating the test coupon together with the gearwheel to be tested, removing the test body from the casing body, determining a material hardness of the test body, and determining, with reference to the material hardness of the test body, the material hardness of the gearwheel.

6. The method according to claim 5, further comprising determining the material hardness of the test body spatially in a middle of the test body.

7. A nonstandard test coupon for testing a material hardness of gearwheels with an ISO-standard-conforming test method, the ISO-standard-conforming test method being a test method which, under identical conditions as a corresponding ISO Standard method, produces results for the nonstandard test coupon that are at least substantially identical to results produced for a standard test coupon by the corresponding ISO Standard method, the nonstandard test coupon comprising:

a two-piece test coupon comprising a casing body and a test body, and the casing body being fabricated from steel according to AISI 310;

the test body and the gearwheel being tested are formed from a same material and produced, in a corresponding manner, in which the test body, the casing body and the gearwheel being tested are heat treated; and the nonstandard test coupon being designed such that an investigation of material properties and a consequent destruction are carried out exclusively on the test body while, in contrast, the casing body being preserved and being reusable.

* * * * *